United States Patent [19]

Simpson

[11] Patent Number: 5,739,745

[45] Date of Patent: Apr. 14, 1998

[54] COMPARATOR CIRCUIT AND METHOD OF USING A COMPARATOR SCHEME FOR DETERMINING MATHEMATICAL RESULTS

[75] Inventor: Richard Simpson, Bedford, United Kingdom

[73] Assignee: Texas Instruments Incorporated, Dallas, Tex.

[21] Appl. No.: 811,333

[22] Filed: Mar. 4, 1997

Related U.S. Application Data

[63] Continuation of Ser. No. 534,963, Sep. 28, 1995, abandoned.

[30] Foreign Application Priority Data

Sep. 29, 1994 [GB] United Kingdom .................. 9419614

[51] Int. Cl.$^6$ ............................................. G06F 7/02
[52] U.S. Cl. ............................................. 340/146.2
[58] Field of Search ................................. 340/146.2

[56] References Cited

U.S. PATENT DOCUMENTS

| 3,210,529 | 10/1965 | Hanson | 235/176 |
|---|---|---|---|
| 4,935,719 | 6/1990 | McClure | 340/146.2 |
| 5,534,844 | 7/1996 | Norris | 340/146.2 |

FOREIGN PATENT DOCUMENTS

| A 0 328 871 | 8/1989 | European Pat. Off. | G96F 7/04 |
|---|---|---|---|
| A-0 191 452 | 8/1986 | Germany | G06F 7/48 |
| 2185 605 | 7/1987 | United Kingdom | G06G 7/50 |

*Primary Examiner*—Margaret Rose Wambach
*Attorney, Agent, or Firm*—William B. Kempler; Richard L. Donaldson

[57] ABSTRACT

This invention relates to a method of using a comparator scheme and to a comparator circuit. The method of using this scheme or the comparator circuit allows a quick and easy test to determine whether a mathematical operation will produce a predetermined value. The scheme allows evaluation of equality or whether the result will be greater than or less than the predetermined value. The comparison operation is much quicker than actually carrying out the mathematical operation in an arithmetic logic unit.

11 Claims, 1 Drawing Sheet

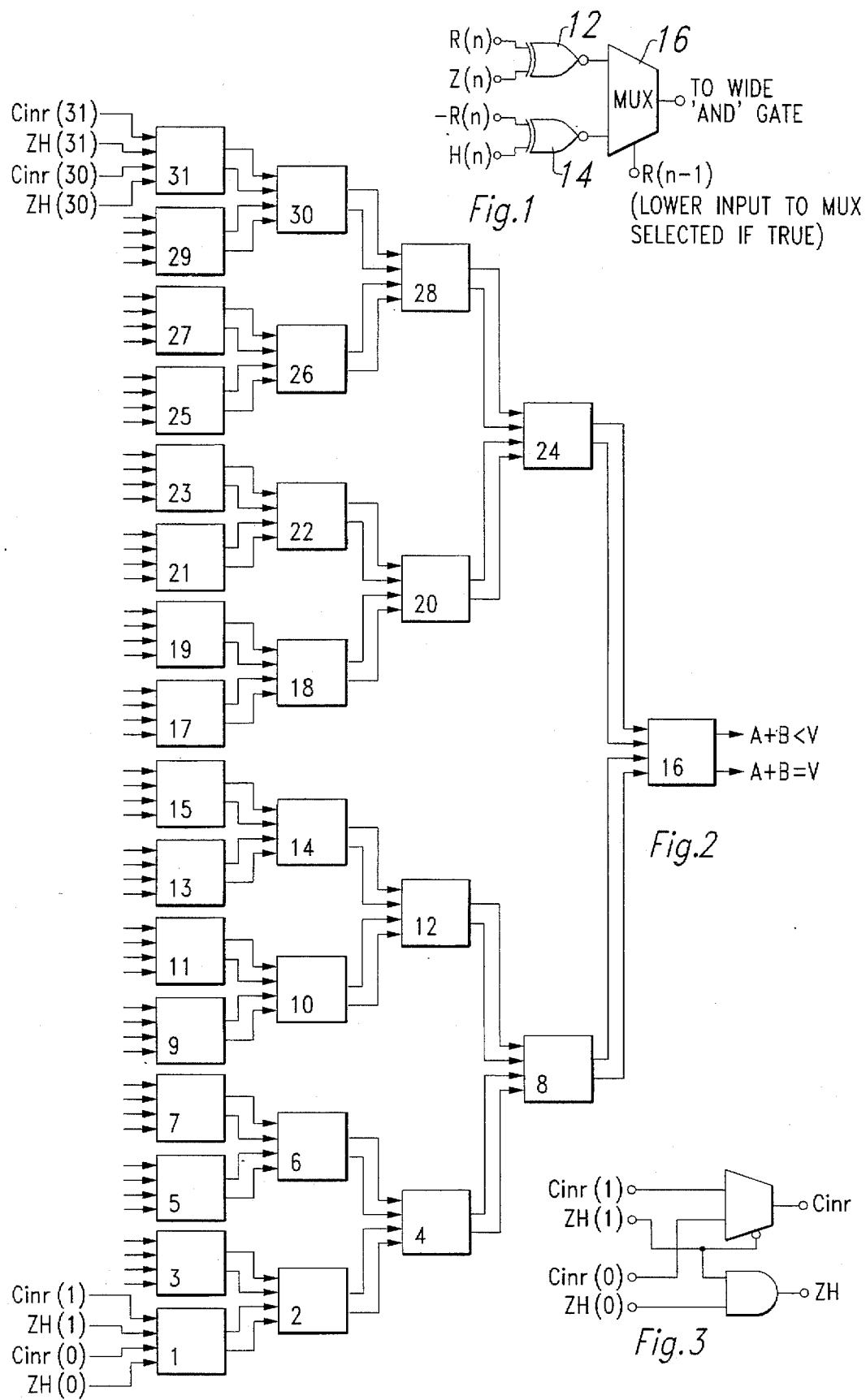

COMPARATOR CIRCUIT AND METHOD OF USING A COMPARATOR SCHEME FOR DETERMINING MATHEMATICAL RESULTS

This application is a continuation, of application Ser. No. 08/534,963, filed Sep. 28, 1995, now abandoned.

A typical microprocessor includes Central Processing Unit (CPU) which comprises circuitry required to access the appropriate locations in memory and interpret resulting instructions. The execution of the instructions takes place in the CPU. The CCPU contains the Arithmetic Logic Unit (ALCU), a control section, various registers etc. The exact content of the CPU will obviously vary depending on the application of the microprocessor. The ALU is a combinational network that performs arithmetic and logical operations on data. Typical operations which are carried out include adding, subtracting, multiplying, dividing and comparing operations.

In operation the speed of the processor is dependent on the speed of operation of any of the individual blocks within the processor. In addition there is constant effort being undertaken to make the components of the processors both smaller and less critical.

Certain methods have been proposed to determined whether the sum of two numbers will be equal to a third number. One such method is disclosed in pending U.S. patent application Ser. No. 08/399,261 filed Mar. 6, 1995. In this method the sum of two or more variables is compared with a predetermined constant value. A test is carried out which confirms that the sum is either equal to or not equal to the constant value.

One problem with this method is that if the test confirms that the sum is not equal to the constant there is no way of knowing which is larger than the other. There are methods which determine the larger of two numbers, but this obviously causes a delay and requires more hardware.

One object of the present invention is to provide a method which tests whether the sum is equal to, greater than or smaller than the constant value with one simple test.

According to one aspect of the present invention, there is provided a comparator scheme for determining the result of a mathematical operation without carrying out said mathematical operation, comprising the steps of: obtaining the value of two or more variables; comparing said variables with a plurality of predetermined conditions thereby determining whether the result of the mathematical operation will be equal to a predetermined value; determining if the test is positive in which case concluding that the result of the mathematical operation is the predetermined value; determining if the test is negative in which case concluding that the result of the mathematical operation is not the predetermined value; and in the event that the test is negative using the results of the comparison to determine whether the result of the mathematical operation is greater than or less than the predetermined value.

This has the advantage that it is possible to determine whether the sum is equal to, greater than or smaller than the constant value.

Reference will now be made, by way of example, to the accompanying drawings in which:

FIG. 1 is a diagram of one part of the circuit of the invention;

FIG. 2 is a diagram of the structure position of a magnitude comparator according to the present invention; and FIG. 3 is a diagram of the functions included in each block of the circuit shown in FIG. 1.

The invention is concerned with identifying the value of the sum of A and B relative to a predetermined value V.

The first part of the new circuit is based on he method for performing an A+B=V test. This relies on comparing the possible carry values with those required to produce the correct target result. This method procedure checks to determine whether there are any occurrences where the carry path cannot have he value required to produce the sum. If there are no occurences then A+B equals V. If there are occurrences, then A+B does not equal V. The following is one approach by which the method operates.

The INPUTS to the carry ripple portion of an adder at any bit position can be represented using three MUTUALLY EXCLUSIVE variables, namely:

| P[n] | Propagate, | Cout=Cin | When adding 1+0, or 0+1; |
| G[n] | Generate, | Cout=1 | When adding 1+1; and |
| K[n] | Kill, | Cout=0 | When adding 0+0. |

Consider the following simple sum.

Sum[n]=P[n] xor Cout[n−1].

If P[n−1] is false, then Cout[n−1] is known and so Sum[n] can be determined with certainty. If P[n−1] is true, then Cout[n−1] is not known and so Sum[n] is not known. But, if P[n] is also true then Sum[n] will be the same as Sum[n−1]. Or, if P[n] is false then Sum[n] will be the opposite to Sum[n−1].

From this analysis it can be seen that examination of P[n,n−1], G[n,n−1] and K[n,n−1] will lead to four possible conditions:

1  Sum[n]=0;

2  Sum[n]=1;

3  Sum[n]=Sum[n−1]; and

4  Sum[n]=~Sum[n−1].

From this information it is possible to make further assumptions. If P[n−1]=0 for a certain Sum[n]=0, then:

P[n]=1 and G[n−1]=1; and/or

P[n]=0 and K[n−1]=1.

Similarly if P[n−1]=0 for a certain Sum[n]=1, then:

P[n]=0 and G[n−1]=1; and/or

P[n]=1 and K[n−1]=1.

It further follows that if P[n−1]=1 for Sum[n]=Sum[n−1] then P[n]=1 and for Sum[n]=~Sum[n−1] then P[n]=0

As can be seen, EITHER the Sum is known, OR the relationship to the previous bit is known. If the full result of the ADD is known, all that is required to test if the answer is the required value, is for each bit to say if it is correct, (i.e. invert if testing for zero, pass if testing for 1), and put these into a wide fast parallel AND gate.

This method does not wait on the SUM at each bit to be available, but considers overlapping pairs. The TEST at each bit is a double test EITHER Sum is known, and the bit is correct, OR IF Sum[n] is not known, the relationship of the bit to Sum [n−1] must be correct. If the double test PASSES at EVERY bit position, the answer WILL be the required result. If this double test FAILS at ANY bit position, the answer WILL NOT be the required result.

The tests are as follows:

If the target result is 00 i.e., it should be established if Sum[n]=0 and Sum[n−1]=0 then EITHER Sum[n]=0, OR Sum[n]=Sum[n−1] which yields the following:

| | |
|---|---|
| P[n]=1 and G[n−1]=1 | Sum[n]=0; |
| P[n]=0 and K[n−1]=1 | Sum[n]=0; and |
| P[n]=1 and P[n−1]=1 | Sum[n]=Sum[n−1]. |

This can be simplified to be P[n]xor K[n−1].

If the target result is 01 i.e., it should be established if Sum[n]=0 and Sum[n−1]=1 then EITHER Sum[n]=0, OR Sum[n]=~Sum[n−1] which yields the following:

| | |
|---|---|
| P[n]=1 and G[n−1]=1 | Sum[n]=0; |
| P[n]=0 and K[n−1]=1 | Sum[n]=0; and |
| P[n]=0 and P[n−1]=1 | Sum[n]=~Sum[n−1]. |

This can be simplified to be P[n]xor ~G[n−1].

If the target result is 10 i.e., it should be established if Sum[n]=1 and Sum[n−1]=0 then EITHER Sum[n]=1, OR Sum[n]=~Sum[n−1] which yields the following:

| | |
|---|---|
| P[n]=0 and G[n−1]=1 | Sum[n]=1; |
| P[n]=1 and K[n−1]=1 | Sum[n]=1; |
| P[n]=0 and P[n−1]=1 | Sum[n]=~Sum[n−1]. |

This can be simplified to be P[n] xor ~K[n−1]. If the target result is 11 i.e., it should be established if Sum[n]=1 and Sum[n−1]=1 then EITHER Sum[n]=1, OR Sum[n]=Sum[n−1] which yields the following:

| | |
|---|---|
| P[n]=0 and G[n−1]=1 | Sum[n]=1; |
| P[n]=1 and K[n−1]=1 | Sum[n]=1; and |
| P[n]=1 and P[n−1]=1 | Sum[n]=Sum[n−1]. |

This can be simplified to be P[n] xor G[n−1].
If two new variables are created, i.e.:

P[n] xor K[n−1]=Z[n]; and

P[n] xor G[n−1]=H[n], then the 00 test is Z[n], the 01 test is ~H[n], the 10 test is ~Z[n] and the 11 test is ~H[n]. The test for bit zero is slightly different. Here it is necessary to test for a 1 with P[0] xor cin; and test for a 0 with P[0] xor~cin. (i.e. evaluate it). The table below illustrates this.

```
1 1 1 1 0 0 1 1
- -
H H H Z Z H H     these must be ANDed together.
```

One way of implementing this approach is to provide two extra xor gates per ALU bit, and create the Z[n] and H[n] terns. These extra are then used, as appropriate, as inputs to a wide AND gate to detect any required value. This is very simple for a constant, for example C.

To compare against a register value, R, the circuit of FIG. 1 may be used. This circuit uses eight more transistors than the XOR gate that is required if the Sum is used, but these gates are now not speed critical, and so could be substantially smaller than would previously have been the case. As can be seen from FIG. 1 circuit to carry out the invention may comprise two XNOR gates 12, 14 and a MUX 16. Outputs of the XNOR gates are passed to the MUX and the register value R[n−1] determines which to pass to the AND gate. Obviously this is just one means by which the function of this invention can be acheived. As will be apparent to the man skilled in the art other Boolean architectures can be chosen which have the same result.

The second part of the new circuit takes these results a stage further by indicating what the effect of the incorrect carry value will be. This is achieved by comparing the required "carry in" at every bit position to produce the target result with the actual carry in. If the carry required to produce the target value is a 1, but the actual carry is a 0 the result will be less than the target value. If the required carry is a 0, but the actual carry is a 1, the result will be more than the target value.

Within an addition, it is quite possible for there to be many places where the required carry and the actual carry differ. It is necessary to use the difference with the most significant bit (MSB) position to determine the result of the A+B>=V test. This is where the conventional (A>=B) magnitude comparator is used. A simple two operand magnitude comparator finds the most significant bit position where the two operands are different and this is used to say if A>B or B>A. (If, at this position, A[n]=1 and B[n]=0 then A>B, or, if A[n]=0 and B[n]=1 then B>A.

The required carry in (Cinr[n]) is easy to determine. The result at any position is Sum[n]=P[n] xor Cin[n], where Cina[n] is the actual carry in. From this, it can be seen that the required carry in Cinr[n]=~(P[n] xor K[n]).

Referring to FIG. 2, in this case the comparator will transfer the value of the required carry in (Cinr[n] at the most significant bit position where the ZH values indicate the carry path will not produce the required target value V. FIG. 3 shows the detail of each block.

If ZH[n]=0, then the corresponding Cinr[n] is irrelevant.

Only if ZH[n]=1 is Cinr[n]relevant, and then the value of Cinr which corresponds to the most significant zero of ZH[n]is the one that determines the result.

The method shown in FIGS. 2 and 3 is a way of transferring to the output value of Cinr[n]which corresponds to the most significant zero of For example:

| n | 7 | 6 | 5 | 4 | 3 | 2 | 1 | 0 |
|---|---|---|---|---|---|---|---|---|
| Cinr | 0 | 1 | 0 | 0 | 1 | 0 | 1 | 0 |
| ZH | 1 | 1 | 0* | 1 | 0 | 1 | 0 | 1 |

In this case ZH[5] is the most significant zero and so Cinr[5] (0) must be transferred to the output For example:

| n | 7 | 6 | 5 | 4 | 3 | 2 | 1 | 0 |
|---|---|---|---|---|---|---|---|---|
| Cinr | 0 | 1 | 0 | 0 | 1 | 0 | 1 | 0 |
| ZH | 1 | 1 | 1 | 1 | 0* | 1 | 0 | 1 |

In this case ZH[3] is the most significant zero and so Cinr[3] (1) must be transferred to the output FIG. 3 shows the basic building block for this.

2 adjacent input values of Cinr and ZH are combined and reduced to a single set of Cinr(out) and ZH(out) in the following manner. If both ZH inputs are 1, then both Cinr[0] and Cinr[1] are irrelevant and this is indicated by ZH(out) also being a1. (The AND gate does this). If ZH[1]=0 then Cinr[1] is the value which determines Cinr(out) and so it is transferred to the output. If ZH[1]=1 then Cinr[0] will be transferred to the output. (The MUX does this).

This can be summarised as follows:

| ZH[1] | ZH[0] | ZH[out] | transfer |
|---|---|---|---|
| 0 | 0 | 0 | Cinr[1] |
| 0 | 1 | 0 | Cinr[1] |
| 1 | 0 | 0 | Cinr[0] |
| 1 | 1 | 1 | Cinr[0] |

The last case where ZH[1]=ZH[0]=1, the transfer out is actually a 'don't care'.

FIG. 2 shows how the basic building block is recursively combined in order to keep reducing the number of terms until eventually there is only a single ZH (the AND of all input ZH's) and a single Cinr which has come from the most significant ZH[n]=0, if there is one.

The Z and H values are used to determine if the sum A+B will be equal to K. If the Z and H values are equal to K, the value of the required carry-in at the left most failing position determines which the larger, A+B or K.

The advantages are that this circuit is significantly faster than a circuit in which is performed and then the result is passed to a magnitude comparator. The number of transistors per bit required for this circuit is constant, and the delay increases only logarithmically.

Example 1

Compare 29 +7 with 33

| 33 | 100001 |
|---|---|
| requires | $\overline{ZZZZZH}$ |
| 29 | 011101 |
| +7 | 000111 |
| | kppgpg |
| H | 010000 |
| ~H | 101111 |
| Z | 011011 |
| ~Z | 100100 |
| | $\overline{ZZZZZH}$ |
| | 111010   ← fails at [2] and [0] |
| Cinr = V xor p | 111011 |
| left most fail is in bit [2]. | V[2] = 0 |
| | p[2] = 0 |
| Cinr[2] = V[2] | xor p[2] = 0 |
| required carry in is 0, therefore A+B > V | |

Example 2

Compare 29+7 with 38

| 38 | 100110 |
|---|---|
| requires | $\overline{ZZHHZZ}$ |
| 29 | 011101 |
| +7 | 000111 |
| | kppgpg |
| H | 010000 |
| ~H | 101111 |
| Z | 011011 |
| ~Z | 100100 |
| | $\overline{ZZHHZZ}$ |
| | 111001   ← fails at [2] and [1] |
| left most fail is in bit [2]. | V[2] = 1 |
| | p[2] = 0 |
| Cinr[2] = V[2] | xor p[2] = 1 |
| required carry in is 1, therefore A+B < V | |

I claim:

1. A method of using a comparator scheme for determining the result of a mathematical operation without carrying out said mathematical operation, comprising the steps of: obtaining the value of two or more variables;
comparing said variables with a plurality of predetermined conditions thereby determining whether the result of the mathematical operation will be equal to a predetermined value;
determining if the comparison is positive in which case concluding that the result of the mathematical operation is the predetermined value;
determining if the comparison is negative in which case concluding that the result of the mathematical operation is not the predetermined value; and
in the event that the comparison is negative using the results of the comparison to determine whether the result of the mathematical operation is greater than or less than the predetermined value.

2. A method of using a comparator scheme according to claim 1, wherein the comparing step comprises inputing the variable values and the predetermined conditions into a logic circuit which compares them to determine equality.

3. A method of using a comparator scheme according to claim 2, further comprising providing the logic circuit including two XNOR gates.

4. A method of using a comparator scheme according to claim 3, further comprising feeding the outputs from the XNOR gates to a MUX.

5. A method of using a scheme according to claim 1, wherein said step of determining if the test is negative or positive further comprises using an AND gate.

6. A method of using a comparator scheme, according to claim 1, wherein the step of using the results of the comparison comprises, determining the magnitude and position of the most significant bit in which the value of the bit in the result is not the same as the equivalent one in the predetermined value;
using the magnitude and position to determine whether the result is greater than or less than the predetermined value.

7. A comparator for determining the result of a mathematical operation without carrying out said mathematical operation, comprising:
comparing means for comparing the value of two or more variables with a plurality of predetermined conditions thereby determining whether the result of the mathematical operation will be equal to a predetermined value;
testing means for determining if the comparison is positive in which case concluding that the result of the mathematical operation is the predetermined value or for determining if the comparison is negative in which case concluding that the result of the mathematical operation is not the predetermined value; and determining means for using the results of the comparison in the event that the comparison is negative to determine whether the result of the mathematical operation is greater than or less than the predetermined value.

8. A comparator according to claim 7, wherein the comparing means comprises a logic circuit.

9. A comparator according to claim 8, wherein the logic circuit includes two XNOR gates.

10. A comparator according to claim 9, further comprising a MUX connected to the outputs from the XNOR gates.

11. A comparator according to claim 7, wherein the determining means comprises circuitry for determining the magnitude and position of the most significant bit of the result in which the value of the bit in the result is not equal to the equivalent bit in the predetermined value and circuitry for using the magnitude and position to determine whether the result is greater than or less than predetermined value.

* * * * *